Nov. 9, 1948.  L. V. GROVER  2,453,431
EASEL FOR COLORED PHOTOGRAPHIC PRINTING
Filed March 11, 1946  2 Sheets-Sheet 1
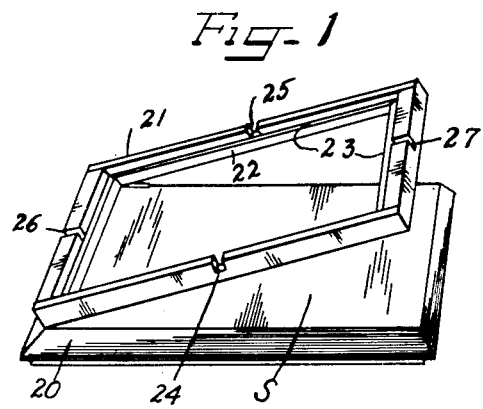
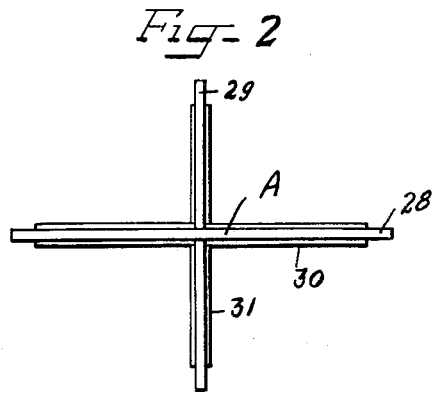
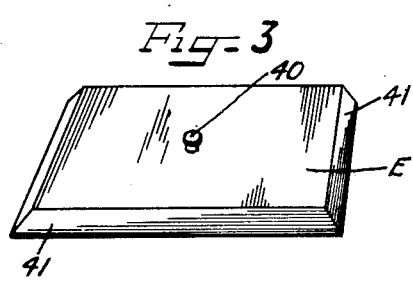
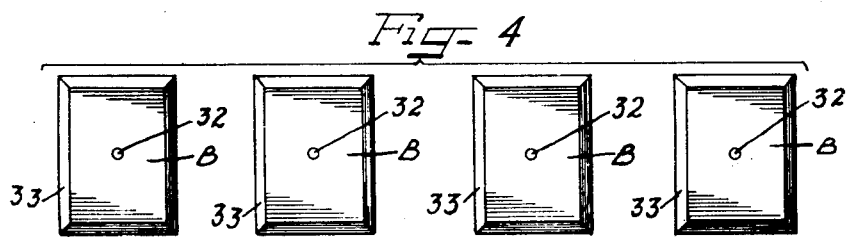
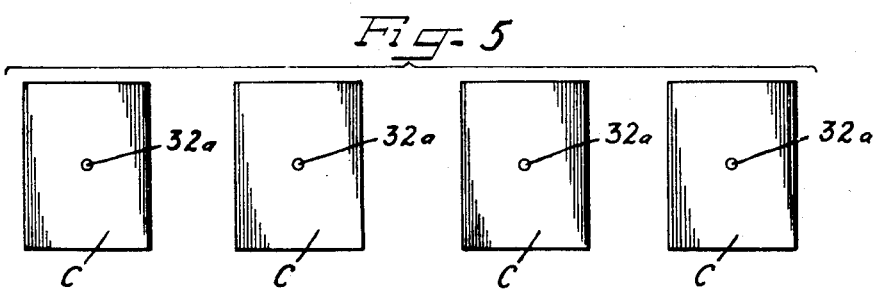
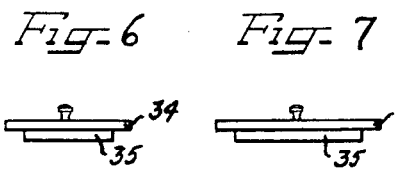
Inventor
LYNDON V. GROVER Nov. 9, 1948.   L. V. GROVER   2,453,431
EASEL FOR COLORED PHOTOGRAPHIC PRINTING
Filed March 11, 1946   2 Sheets-Sheet 2
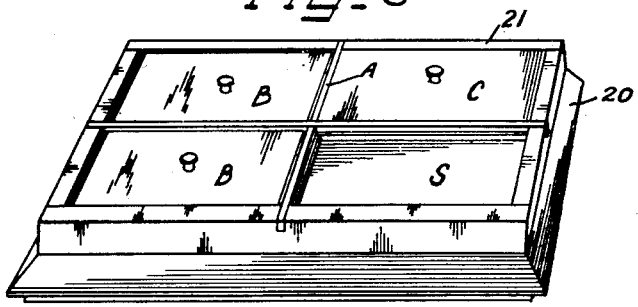
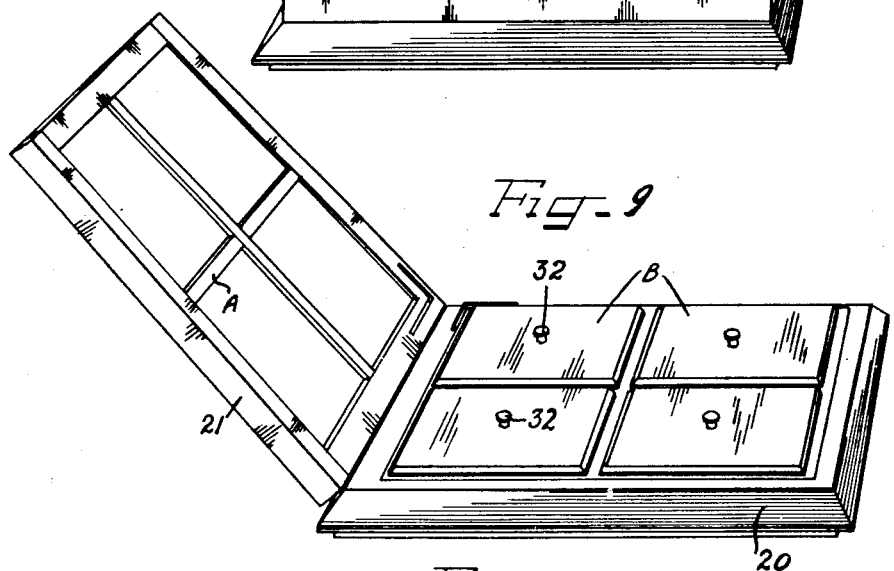
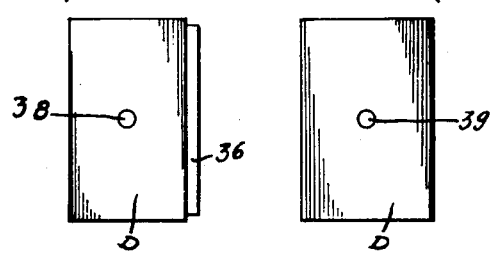
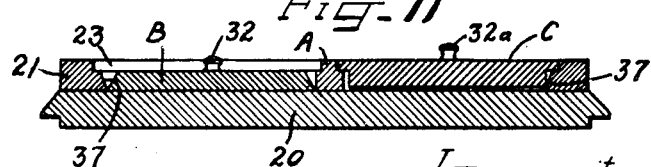
Inventor
LYNDON V. GROVER Patented Nov. 9, 1948

2,453,431

UNITED STATES PATENT OFFICE 2,453,431

EASEL FOR COLORED PHOTOGRAPHIC PRINTING

Lyndon V. Grover, Los Angeles, Calif.

Application March 11, 1946, Serial No. 653,644

3 Claims. (Cl. 88—24)

1

The present invention relates to an easel for photographic printing and more particularly to a structure for use in making colored photographic prints, or other direct work, whereby separate exposures of different parts of the same sheet of sensitized paper may be made.

In color photography, such as "Kodachrome," the exposed film, after developing or processing, becomes a positive, not a negative as in black and white photography. In making prints from this positive it is necessary to use a special paper which after developing and processing produces a positive print.

The easel of the present invention makes it possible to make separate exposures of the borders of the entire sheet, or a fractional part thereof, so that the finished colored prints will have white borders. The structure may be used in making black and white prints to provide black borders instead of the usual white borders, if so desired.

Inasmuch as it is possible to get color printing paper, at the present time, in but one size, to wit, 8 x 10 inches, it is desirable that the easel may be adapted for printing pictures in sizes smaller than 8 x 10, without having to cut the original sensitized sheet.

It is therefore an important object of the present invention to provide an easel for photographic printing whereby exposures of different parts of the same sensitized sheet of paper may be made.

Another object of the present invention is to provide an easel for photographic printing to produce white borders for colored prints.

A further object of the present invention is to provide a photographic easel for facilitating printing in color as well as in black and white.

Another and yet further object of the present invention is to provide a photographic easel having means for printing different portions of a sensitized sheet, including means for masking much portions of the sheet as are not at the moment being exposed to printing.

The invention has for an additional object the provision of a photographic easel having sheet masking means for masking the subject portion of a sensitized sheet while the border portions are being exposed to light.

A yet further object of the present invention is to provide a photographic easel with means for masking the border portions of a sensitized sheet while the subject portion thereof is being printed.

Another and yet further object of the present invention is to provide a photographic easel with border blocks shaped to prevent reflected light

2 from striking portions of the sensitized sheet which are masked against exposure.

Generally speaking, the easel of the present invention includes a base on which the sensitized sheet to be printed is placed. A frame is hinged to the base so shaped as to overlie the marginal portions of the sensitized sheet on the base. A removable spider is provided for support by the frame, which spider comprises crossarms overlying the sheet. The arms have flanges. Border blocks are provided, of such size and shape as to fit within the openings defined by the spider and rest against the surface of the sensitized sheet. The border blocks are used when the subject portion of the sheet is to be masked while the border portions are being printed. To print the border portions, the blocks are placed against the sheet, the frame is swung away from the base and the sheet exposed to light which exposes the border portions of the sheet. Thereafter the frame is swung back against the sheet and the border blocks are removed from the frame. Then light trap blocks are applied to the frame in place of the border blocks, the light trap blocks engaging the flanges of the spider and the frame, and being white in color, so that any section of the frame may be centered with respect to the source of light, to print that section. When so centered the light trap block for that section is removed and the portion of the sheet within that particular opening defined by the spider is exposed to light. Thereafter the light trap block is replaced to cover that section and another portion of the sheet is exposed, until all of the surface of the sheet has been properly exposed.

It is to be understood that the sizes of the spider and frame openings, and the blocks to cooperate with them, may be of any desired size and shape. I have found that a block for one 8 x 10 exposure, two 5 x 7 exposures, and four 4 x 5 exposures will suffice for all practical purposes.

The above, other and further objects of the present invention will be apparent from the following description and accompanying drawings.

Embodiments of the present invention are illustrated in the accompanying drawings, and the views thereof are as follows:

Figure 1 is an isometric view of the easel of the present invention, showing the frame partially open;

Figure 2 is a plan view of the spider removed from the frame;

Figure 3 is an isometric view of one of the border blocks;

Figure 4 is a plan view of four border blocks for 4 x 5 prints;

Figure 5 is a plan view of four light trap blocks for 4 x 5 prints;

Figure 6 is an end view of one of the border blocks of Figure 5;

Figure 7 is a side elevational view of one of the border blocks of Figure 5;

Figure 8 is an isometric view of the easel with the frame closed, two border blocks in place, one light trap block in place, and one opening defined by the spider uncovered to allow exposure of that portion of the sensitized sheet below it;

Figure 9 is an isometric view of the easel with four 4 x 5 border blocks in place and the frame and spider swung away, for printing borders about the four blocks, for making four 4 x 5 prints;

Figure 10 is a plan view of two light trap blocks for 5 x 7 prints, one of which blocks is provided with a side flange to define the border between the two prints; and Figure 11 is an enlarged cross-sectional view through the base and frame showing in section one border block in place and in another section one light trap block in place.

The drawings will now be explained.

Inasmuch as color printing paper is available, at the present time, in only one size, to wit, 8 x 10, the easel will be made to receive one such sized sheet.

Referring to Figure 1, the easel includes a base 20 having a flat top surface on which the sheet of paper S is placed, sensitized side up. A frame 21 is hinged at one end to the base 20 to be swung against and away from the flat upper surface of the base. The upper portion of the frame 21 is provided with internal flanges 22 forming shoulders 23. The contour of the inner opening of the frame, as defined by the flanges 22, is of the size normally used for making 8 x 10 prints.

Side rails of the frame 21 are notched at 24 and 25 respectively, at mid length of the rails, while the end rails are notched at 26 and 27 at mid length of the end rails.

For removable support in the frame a spider, designated generally as A illustrated in Figures 2 and 3, is made with crossarms 28 and 29 intersecting at their mid points, the arm 28 being the longer and of such length that its ends engage with the notches 26 and 27 in the end rails of the frame. The shorter crossarm 29 engages by its ends in the notches 24 and 25 in the side rails of the frame. The crossarms 28 and 29 are provided with flanges 30 and 31 respectively which align with the flanges 22 of the frame when the spider is in place. When the spider is in place, four equal sized openings result. The spider as constructed in the manner shown in Figure 2 is intended to co-operate with the frame 21 to outline four spaces, for making four 4 x 5 prints on a single 8 x 10 sheet supported on the base 20.

Figure 8 shows the spider A in place in the frame 21.

To mask or cover the subject areas of the sheet, for 4 x 5 prints, four border blocks B are provided. These are illustrated in Figure 9, every block being rectangular in plan and with a flat under surface, and provided top side with a knob 32 for prehension. Every block has its side margins beveled at 33 so as to prevent any light reflected from such margins reaching any portion of the sensitized sheet underlying the blocks.

To make four 4 x 5 prints from a single sheet of 8 x 10 color paper, the paper is applied to the base 20 of the easel, the spider A is inserted in the frame 21, and the frame lowered against the sheet. The openings defined by the frame and the spider are then closed by the four border blocks B which, because of the guidance offered by the frame and spider, are symmetrically placed on the sheet. The frame and spider are then swung away from the base with the blocks in the position shown in Figure 9. The sheet is exposed to a source of light to print the borders thereof about and around the four subject areas protected from exposure by the blocks B. After the borders have been exposed, the frame with the spider in it is closed against the base. The border blocks B are removed and then four light trap blocks C are applied to the spider and frame. Four such blocks for 4 x 5 prints are illustrated in plan in Figure 5. Figures 6 and 7 show the end and side elevational views of these blocks where it will be noted that a block has a cover portion 34 and a central body portion 35 against the under surface of the cover portion 34, the margins of the body portions 35 being less in dimension than the cover portion 34, to thus provide overhang so that when a light trap block is applied to the frame and spider, the body portion will rest on the shoulders defined by the flanges 22 of the frame and 30 and 31 of the spider to thus effectively shut out all light from the portion of the sensitized sheet underlying such light trap blocks. As before stated, four such blocks are applied to the frame and spider to successively enable printing of the four subject portions of the sheet. Knobs 32a are secured to the blocks to manipulate them.

To print one section, the easel is moved about underneath the source of light until one of the light trap blocks is in full register with the spread of light, whereupon such light trap block is removed and the portion of the sheet underlying it is exposed to light for a proper length of time, to print that portion of the sheet. The light block is then replaced and the easel shifted to bring another light block underneath the source of light to print the second portion of the sheet. The process is continued until all four portions of the sheet have been printed.

Thus when a sheet is developed and processed, a positive print will result having white borders. The sheet is then cut to separate the four prints made on it.

In the event it is desired to make two 5 x 7 prints on an 8 x 10 sheet, then the frame 21 is closed against the sheet, the spider is removed, and the two blocks D and D', shown in Figure 10, are applied to the frame. These blocks have shoulder portions to co-operate with the flanges 22 of the frame. The block D is provided with a lateral flange 36 to define the border between the two subject portions of the sheet, when the blocks are in place. To make two 5 x 7 prints using these blocks, the easel is manipulated until the block D' is in register with the area of light, whereupon the block D' is removed and the underlying portion of the sheet exposed for the proper length of time for making a print on that portion of the sheet. The blocks D and D' are interchanged so that the block D will then cover the exposed area of the sheet and its flange 36 will define the border between it and the block D' which have been shifted to overlie the unexposed portion of the sheet. Block D', in the new position, is then brought in register with the area of light, and the block is removed for printing to space the printing of the sheet. The block D' is then returned to cover a second exposed area of the sheet. The two light trap blocks D and D' are then removed and two border blocks each of 5 x 7 size, are applied over the sensitized sheet, which when in position against the end rails of the frame define a central opening between them which will be the border between the two printed areas of the sheet. When these border blocks are in place, the frame is moved away from the base and the border portions of the sheet exposed to light. Thus when the sheet is developed and processed, there will be two colored 5 x 7 prints having white borders.

If it is desired to make one 8 x 10 print, the frame 21 is closed against the sensitized sheet on the base 20, and a border block E, having a handle 40, such as that shown in Figure 3, is applied over the sheet within the frame. This border block is of 8 x 10 size, and has beveled margins 41. The frame is then swung back, exposing the border of the sheet to light which when exposed is covered by return of the frame against the base, whereupon the border block is removed and the subject area of the sheet exposed for printing.

Referring to Figure 11, it will be noted that the inner margins 37 of the rails of the frame are beveled to reflect light away from the surface of the sensitized sheet on the base 20. This figure shows the relationship of a border block B to a frame rail and the spider where it is placed against a portion of the surface of the sensitized sheet. A light trap block C is illustrated as being supported on the flanges of the frame and spider in light tight relationship to prevent access of light to the portion of the sensitized sheet underlying it.

The border blocks D and D' are provided with knobs, or other handle means, 38 and 39 respectively.

Figure 11 shows the cross sectional shape of the crossarms 28 and 29 of the spider A.

The easel of the present invention may be used in black and white printing for providing a black border upon the prints. In such event the printing sheet may be exposed to light with the subject area protected, thereafter the border protected and the subject area of the sheet exposed producing black and white prints with a black border.

The present invention has to do with an easel for photographic printing for use in making colored photographic prints.

At the present time colored photographic prints are made by what is known as the reversal process. That is to say the subject area of the printing paper upon exposure, becomes a negative. During development of the paper, it becomes first a negative and then reverses and becomes a positive so that the finished product is a positive.

Therefore in order to have white borders about the subject areas of a colored print it is necessary, to expose the border areas to light so that when the paper is fully developed as a positive the borders will be white instead of black.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A photographic easel comprising a body portion including a base having a flat surface for supporting a printing sheet, a frame hinged to said base to be moved against and away from said surface, a spider removably supported by said frame and co-operating therewith to divide said printing sheet into areas of less extent than the area of the entire sheet, border blocks within said areas and against said sheet for excluding light from said sheet areas and having beveled sides so that the frame and spider may be removed while the blocks remain in place whereby the borders about said blocks may be exposed to light to thereby provide white borders for said areas when subsequently printed.

2. A photographic easel comprising a body portion including a base having a flat surface for supporting a printing sheet, a frame hinged to said base to be moved against and away from said surface, a spider removably supported by said frame and co-operating therewith to divide said printing area into areas of less extent than the area of the entire sheet, and white light trap blocks overlying said areas and supported by said spider and frame in light tight engagement whereby said easel may be positioned under a light source and the easel shifted to limit the projected light to one of said blocks to thereafter print the sheet area under said block after said block is removed.

3. A photographic easel comprising a base having a flat surface for supporting a printing sheet, a frame hinged to said base for movement against and away from said surface, said frame contacting edge portions of said sheet when moved against said base to maintain said sheet in position on said surface and to mask said edge portions, a spider removably positioned on said frame for movement therewith and contacting said sheet to divide the same into a plurality of smaller areas of less extent, a plurality of removable border printing blocks and a plurality of light trap blocks, some of either of which are adapted to simultaneously and selectively cooperate with said smaller areas, each of said border printing blocks being of such size and configuration as to fit within its respective smaller area to mask the center subject portion of the area and having beveled sides to permit the movement of said frame and said spider from contact with the sheet to expose the borders of the area while remaining in position on the printing sheet surface to mask the center subject portion of the area, each of said light trap blocks also fitting within its respective smaller area to mask the center subject portion of the area and having integral flanges along each side to overlie adjacent portions of said frame and said spider to provide a light-tight seal to prevent undue exposure of said area during exposure of the remainder of the sheet, and each of said light trap blocks being removable from contact with said sheet for exposure of the central subject portion of the smaller area lying therebeneath.

LYNDON V. GROVER.

REFERENCES CITED

The following references are of record in the file of this patent:

UNITED STATES PATENTS

| Number | Name | Date |
| --- | --- | --- |
| 1,817,606 | Bern | Aug. 4, 1931 |
| 2,108,295 | Prucha | Feb. 15, 1938 |
| 2,348,999 | Peterson | May 16, 1944 |

OTHER REFERENCES

Munn, "A Negative Carrier," from The British Journal of Photography, August 2, 1935, pages 487, 488 and 489.